United States Patent [19]

Acosta

[11] Patent Number: 4,846,691

[45] Date of Patent: Jul. 11, 1989

[54] CHILD'S ASSOCIATION GAME

[76] Inventor: Anita S. Acosta, 322 Drury La., San Antonio, Tex.

[21] Appl. No.: 230,517

[22] Filed: Aug. 10, 1988

[51] Int. Cl.⁴ .............................................. G09B 19/00
[52] U.S. Cl. .................................................... 434/259
[58] Field of Search ........................ 434/258, 259, 260

[56] References Cited

U.S. PATENT DOCUMENTS

| | | | |
|---|---|---|---|
| 2,623,303 | 12/1952 | Mindel | 434/259 |
| 3,427,731 | 2/1969 | Debolt | 434/260 |
| 3,496,652 | 2/1970 | Wolfner et al. | 434/259 |
| 3,546,788 | 12/1970 | Drumm | 434/260 |
| 4,083,123 | 4/1978 | Livermore | 434/260 X |
| 4,457,722 | 7/1984 | Housand | 434/260 |
| 4,522,598 | 6/1985 | Coyne et al. | 434/259 |
| 4,533,336 | 8/1985 | Dixon . | |

FOREIGN PATENT DOCUMENTS 1109819  4/1968  United Kingdom ............... 434/259

*Primary Examiner*—William H. Grieb
*Attorney, Agent, or Firm*—Leon Gilden

[57] ABSTRACT

A child's association game is set forth to test and develop a child's coordination and association of geometric shapes and colorations wherein a first series of locked boxes, as positioned on a toy truck, contain a like series of secondary boxes which in turn are locked at each of six sides to contain six spheres within separate boxes therein. A respective first, second, and third series of keys of varying colorations are utilized to respectively unlock the first series of locked boxes, secondary boxes, and spheres. The keys and respective boxes and spheres are coordinated by like coloration and key configuration.

5 Claims, 1 Drawing Sheet

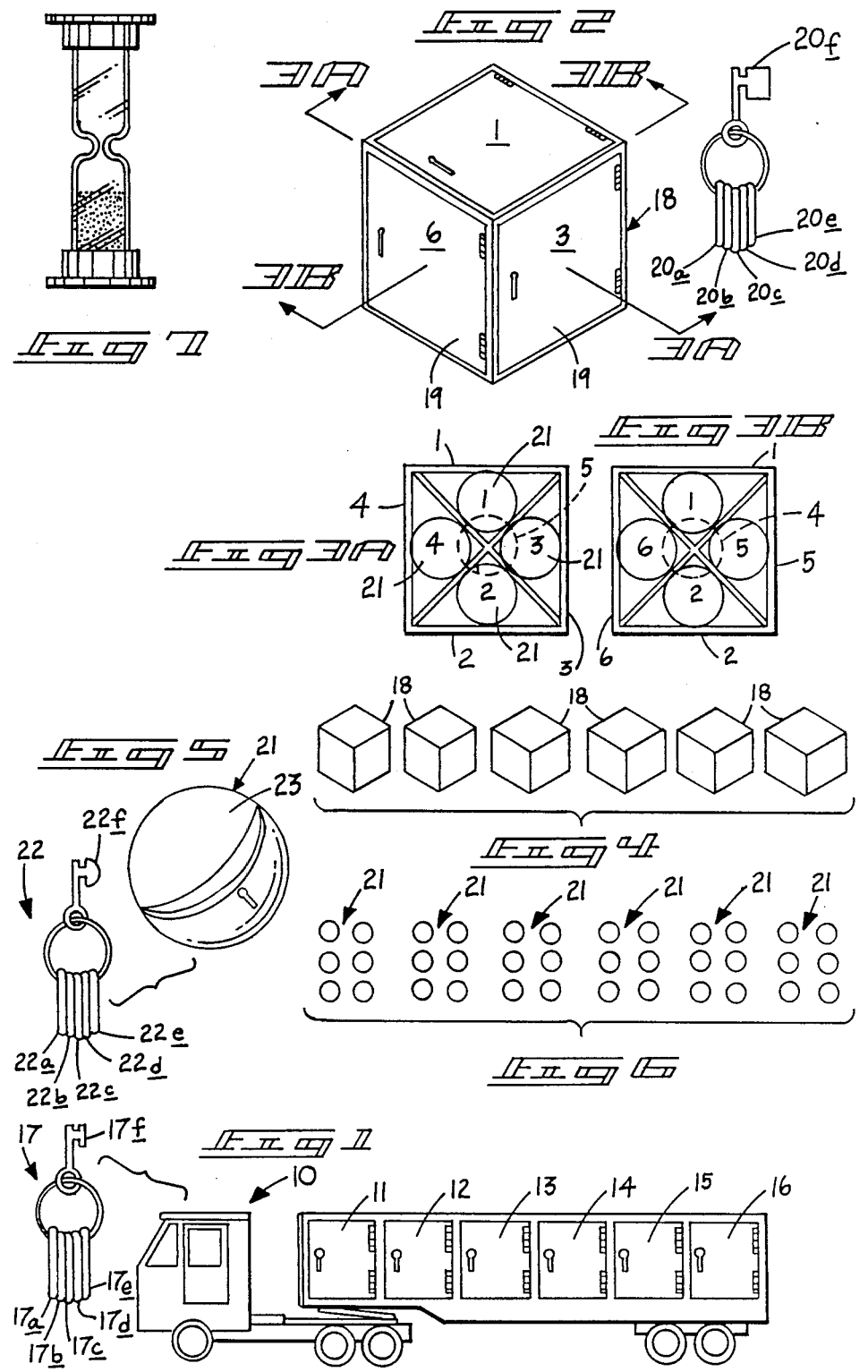

CHILD'S ASSOCIATION GAME

BACKGROUND OF THE INVENTION

1. Field of the Invention

The field of invention relates to educational and testing devices, and more particularly pertains to a new and improved child's association game to test and enhance a child's coordination of geometric shapes and associated colors.

2. Description of the Prior Art

The use of testing and association type games is well known in the prior art. The devices in the past have employed a variety of coordinated activities for testing children's ability in their aptitude for coordinating shapes, colorations, and the like. For example, U.S. Pat. No. 3,427,731 to Debolt sets forth a device testing the dexterity of an individual with a base including a plurality of threaded members mounted orthogonally thereto with each threaded element utilizing a predetermined thread characteristic relative to pitch and size with a corresponding number of individual threaded elements having thread characteristics corresponding to the threaded elements on the base threaded member to be threadedly connected thereto. Data and computed scores are determined based on time and success of properly associating the various elements together.

U.S. Pat. No. 3,546,788 to Drumm sets forth a teaching system including a container formed with a character formed to an interior surface with a phonograph record located in a pocket formed in the container. The record provides a child listing steps involved in performing an act requiring hand and finger dexterity.

U.S. Pat. No. 4,083,123 to Livermore sets forth an invention providing a teaching aid for use by children in associating mechanical units of various configurations capable of being connected together in a jigsaw puzzle-type manner.

U.S. Pat. No. 4,457,722 to Housand provides an educational toy utilizing a container formed with a plurality of locks and latches and mechanical securement devices wherein the various tools and locks are to be utilized to open the various pivotal doors associated with the container to enhance and improve a child's dexterity and coordination.

U.S. Pat. No. 4,533,336 to Dixon sets forth a toy vehicle with hinged and lockable doors and the like wherein the vehicle is capable of being completely taken apart and returned in an assembled manner requiring obvious coordination of a child, or the like.

As such, it may be appreciated that there is a continuing need for a new and improved child's association game that provides the advantages of color and geometrical configuration association in the same device, as well as simplicity of use and operation and in this respect, the present invention substantially fulfills this need.

SUMMARY OF THE INVENTION

In view of the foregoing disadvantages inherent in the known types of child's assocation games now present in the prior art, the present invention provides a child's association game utilizing various geometrical configurations in a nested relationship to test and develop a child's manual dexterity and color coordination abilities. As such, the general purpose of the present invention, which will be described subsequently in greater detail, is to provide a new and improved child's association game which has all the advantages of the prior art association games and none of the disadvantages.

To attain this, the present invention comprises a first series of locked boxes formed within a toy vehicle with a first key ring of various colorations to unlock the respective doors of the first series of doors that are color coordinated to the keys. A second series of boxes are positioned within the first series of boxes and are removable therefrom wherein each of the second series of boxes is formed with six locked doors unlockable by color associated keys. Within each of the second series of boxes are a respective series of spheres, also to be unlocked by color coordinated keys. Each of the series of keys is not only color coordinated, but is formed of various key configurations to require not only color coordination of the various doors to be opened, but geometrical compatibility with the various door locks as well.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved child's association game which has all the advantages of the prior art child's association games and none of the disadvantages.

It is another object of the present invention to provide a new and improved child's association game which may be easily and efficiently manufactured and marketed.

It is a further object of the present invention to provide a new and improved child's association game which is of a durable and reliable construction.

An even further object of the present invention is to provide a new and improved child's association game which is susceptible of a low cost of manufacture with regard to both materials and labor, and which accordingly is then susceptible of low prices of sale to the consuming public, thereby making such child's association game economically available to the buying public.

Still yet another object of the present invention is to provide a new and improved child's association game which provides in the apparatuses and methods of the prior art some of the advantages thereof, while simultaneously overcoming some of the disadvantages normally associated therewith.

Still another object of the present invention is to provide a new and improved child's association game utilized to develop a child's manual dexterity and color coordination abilities by providing a nested series of geometrical objects within each other and requiring various keys to unlock doors of the various series of geometrical configurations.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and description matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an orthographic view taken in elevation of the toy vehicle containing the first series of boxes and associated keys therewith.

FIG. 2 is an isometric illustration of one of a series of secondary boxes positionable within the first series of boxes of FIG. 1 and associated keys therewith.

FIG. 3a is an orthographic view taken along the lines 3a—3a of FIG. 2 in the direction indicated by the arrows.

FIG. 3b is an orthographic view taken along the lines 3b—3b of FIG. 2 in the direction indicated by the arrows.

FIG. 4 is an isometric illustration of the second series of boxes in diagrammatic form.

FIG. 5 is an isometric illustration of the spheres positioned within the second series of boxes and associated keys therewith.

FIG. 6 is a diagrammatic illustration of the series of spheres associated with the second series of boxes.

FIG. 7 is an orthographic view taken in elevation of a typical timing device as utilized by the instant invention.

DESCRIPTION OF THE PREFERRED EMBODIMENT

With reference now to the drawings, and in particular to FIGS. 1 through 7 thereof, a new and improved child's association game embodying the principles and concepts of the present invention is set forth.

More specifically, it will be noted that the child's association game essentially comprises a toy truck vehicle 10 formed with a first series of lockable compartments indicated by first lockable compartment 11, second lockable compartment 12, third lockable compartment 13, fourth lockable compartment 14, fifth lockable compartment 15, and sixth lockable compartment 16. The compartments utilized hinged doors, as illustrated, with a conventional key lock within each door wherein a first key ring series 17 utilizes various keys 17a through 17f respectively associated with the compartments 11 through 16 in that order. The keys 17a and 17f are of various colors to coincide with their respective compartments 11 through 16 to visually associate the various keys with the various compartments. To this end, each key is formed with a different configuration associated with a respective compartment where it is of exemplary illustration that key 17f is associated with the lock of compartment 16 of a particular compatible configuration that will vary from the other keys 17a through 17e to reinforce the color association of the keys and the respective compartments.

Within each lockable compartment 11 through 16 is positioned a box 18, as illustrated in FIG. 2, formed with six hinged and lockable doors wherein for purposes of illustration, doors 1, 3, and 6 are shown but similarly, the doors 2, 4, and 5 are of equal configuration. Accordingly, the respective six doors of each of the six boxes 18, as illustrated in FIG. 4, nestably fit within respective compartments 11 through 16 and are also provided with color coded doors 1 through 6 consistent with each door of each box 18. A second series of keys 20 also includes color coded series 20a through 20f of equal coloration to a companion door of boxes 18 that respective key is to open and accordingly, each key configuration is different to enable opening of that associated door only.

Behind each respective door of each box 18 is formed a pyramidal compartment enabling positioning of six spheres therein, as illustrated in FIGS. 3a and 3b. Accordingly, there are thirty-six spheres in total with individual sphere illustrated in FIG. 5 with a door 23 associated therewith latched to the sphere by an associated key lock. As in the first and second key series, a third key series 22 is illustrated also in FIG. 5 and utilizes keys 22a through 22f formed with color coordinated keys to the associated color coordinated spheres with each configuration of key compatible only with the associated color coordinated door key lock.

A timer device, as illustrated in FIG. 7, such as an hour glass type timer, is utilized in timing the event to test the extent to which a child or other participant may successfully open the greatest number of compartments 11 through 16, and associated boxes 18, and each box's associated sphere grouping.

The manner of usage and operation therefore of the instant invention should be apparent from the above description and accordingly, no further discussion relative to the manner of usage and operation will be provided.

With respect to the above description then, it is to be realized that the optimum dimensional relationship for the parts of the invention, to include variations in size, materials, shape, form, function and manner of operation, assembly and use, are deemed readily apparent and obvious to one skilled in the art, and all equivalent relationships to those illustrated in the drawings and described in the specifications are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A child's association game for testing and enhancing the mechanical dexterity of a participant comprising,
   a module including a plurality of lockable compartments, each including individual lockable first doors, and
   a plurality of box members equal in number to the plurality of compartments, and
   each box member individually positionable within an associated compartment, and
   each box formed with six sides and each side including a lockable second door, and
   a pyramidal compartment associated with each lockable second door wherein six compartments are formed within each box member, and
   a plurality of spheres with a single sphere positionable in each pyramidal compartment, and
   each sphere formed with a lockable third door, and
   a plurality of key means for locking and unlocking each of said first, second, and third doors.

2. A child's association game as set forth in claim 1 wherein a timer mechanism is utilized for timing the number of compartments, box members, and spheres the participant may open.

3. A child's association game as set forth in claim 2 wherein each of said lockable first doors is of a different coloration and wherein a first key means of said plurality of key means is formed with a like number of keys to the number of lockable first doors and each key is of a coloration equivalent to a compartment for cooperation with an individual compartment only.

4. A child's association game as set forth claim 3 wherein each of said second doors is of a different coloration and said plurality of key means includes a second key means comprising six keys wherein each of said six keys is of a different coloration equivalent to the different colorations of said second doors.

5. A child's association game as set forth in claim 4 wherein each sphere is of a different coloration and said plurality of key means includes a third key means wherein said third key means includes six keys of different colorations equivalent to said different colorations of said six spheres.

* * * * *